O. H. SLEEPER.
LOCK NUT.
APPLICATION FILED JULY 7, 1916.

1,217,520.

Patented Feb. 27, 1917.

Inventor
Otis H. Sleeper
By
Attorney

UNITED STATES PATENT OFFICE.

OTIS H. SLEEPER, OF EXETER, NEW HAMPSHIRE, ASSIGNOR TO BOSTON LOCK-NUT COMPANY, OF BOSTON, MASSACHUSETTS, A CORPORATION OF MASSACHUSETTS.

LOCK-NUT.

1,217,520.     Specification of Letters Patent.    Patented Feb. 27, 1917.

Application filed July 7, 1916. Serial No. 107,893.

*To all whom it may concern:*

Be it known that I, OTIS H. SLEEPER, a citizen of the United States, residing at Exeter, county of Rockingham, State of New Hampshire, have invented certain new and useful Improvements in Lock-nuts, of which the following is a specification.

This invention relates to lock nuts of the type wherein the nut itself is altered to contain the locking feature.

The object of my invention is to provide a simple and inexpensive lock nut which may be readily applied to a bolt and will grip it tightly to prevent accidental disengagement therefrom under the loosening tendency of repeated vibration. In carrying out my invention, a nut of generally standard type is used. The upper end of the nut has a portion of one side thereof removed to the depth of one or more threads. The opposite side of the nut is then crowded inwardly to project those threads included in said crowded area into the bolt opening, deflecting these threads out of the line of their normal spiral. This produces a nut one or more threads of which are disposed in position to bind with the bolt threads as the nut is run down upon the bolt. This binding is produced by the tendency of the nut to tilt on the bolt as it is run down, thus taking up all the slack or back-lash between the threads of the nut and bolt.

The construction and operation of my device is fully disclosed in this specification. In the accompanying drawings I have shown an embodiment which not only well illustrates the principles of my invention but is in itself a form found satisfactory in use and well adapted to the requirements of manufacture. Throughout the specification and drawings like reference numerals are correspondingly applied, and in the drawings, Figure 1 is a plan view of a standard nut and showing it before an area thereof is forced inwardly.

Figure 1:
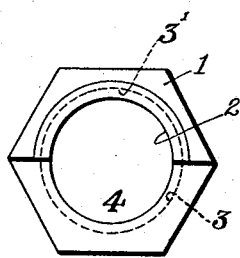
Figure 2:
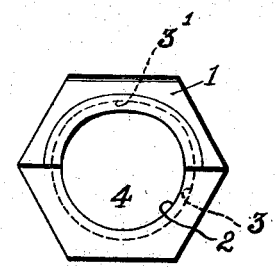
Fig. 2 is a similar view showing the nut after said area has been constricted.
Figure 3:
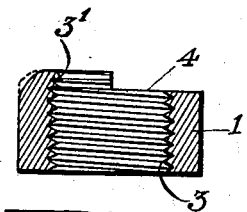
Fig. 3 is a vertical section through the nut of Fig. 2 and indicating in dotted lines the position from which the constricted area has been forced.
Figure 4:
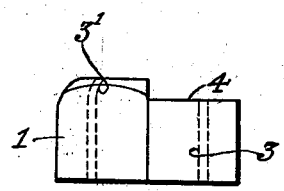
Fig. 4 is an elevation of the nut of Fig. 2.
Figure 5:
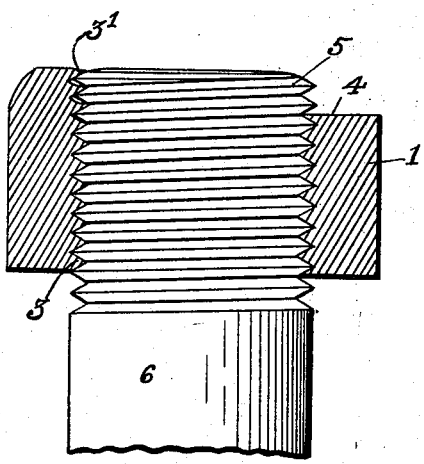
Fig. 5 is a view showing my nut applied to and locked upon a bolt, the nut being in section and the bolt in elevation.

I have indicated at 1 a generally standard nut altered to embody my invention. The nut has a normally truly circular bore 2 which is threaded as indicated at 3 to engage the threads 5 of a bolt 6. One side of the upper end of the nut is removed as indicated at 4 to the depth of one or more (here shown as two) threads. The opposite side of the nut is forced inwardly in any suitable manner from the dotted line position indicated in Fig. 2 to cause the threads 3' included in said restricted area to project into the bore of the nut as shown.

When the nut is run down on the bolt, the tendency of the nut to tilt on the bolt takes up the slack between nut and bolt threads and the locking threads 3' finally bind on the bolt threads, preventing further downward travel of the nut as well as an upward disengaging movement of the nut under the loosening tendency of repeated vibration. While the threads 3' included in the constricted area of the nut are referred to as locking threads herein, it will be understood that the threads of the nut below said threads 3' are all projected inwardly to some extent, so that practically all the nut threads really bind on the bolt to some degree. The degree of constriction of the other threads is of course less than that of the threads directly included in the constricted area and toward the lower face of the nut is practically negligible. No attempt has therefore been made to illustrate the constriction of these lower threads.

Although the nut is here shown as having one side of its upper face removed to permit corresponding inward deflection of the opposite side of the nut, it will be understood that the nut might be normally of the thickness of the side indicated at 4 and that the higher opposite side might be added onto the normal thickness of the nut.

Various other modifications in the form and construction of my invention may obviously be resorted to if within the limits of the appended claims.

What I therefore claim and desire to secure by Letters Patent is:

1. A lock nut consisting of a member having a continuously threaded cylindrical bore and having one side of a face thereof disposed in a plane above the plane of the side diametrically opposite thereto, said higher side being set in at its center to alter the diameter of said bore and to thereby dispose the threads of that portion of the bore included in said higher side in position to bind upon the threads of the bolt with an increased thread engaging friction as the nut is run down upon the bolt.

2. A lock nut consisting of a member having a continuously threaded bore and having a semi-circular portion on one side of said bore forced inwardly to project the threads included in said constricted area into said bore in position to bind on the bolt threads as the nut is run down on the bolt.

3. A lock nut consisting of a continuously threaded member having one side removed to the depth of one or more threads and having its opposite side forced inwardly to project the threads included in said constricted area into said bore in position to bind on the bolt threads as the nut is run down on the bolt.

4. A lock nut consisting of a member having a continuously threaded cylindrical bore, the material on one side of said bore and disposed about one half of said bore extending beyond the top plane of the opposite side, said extended side being set in at the center thereof to shorten the central diameter thereof and lengthen the diameter of said bore at the ends of said extended portion to give to the center portion an increased thread engaging friction and to clear the cut ends of the threads against any cutting tendency.

In testimony whereof I affix my signature in presence of two witnesses.

OTIS H. SLEEPER.

Witnesses:
VICTORIA LOWDEN,
AGNES V. O'CONNELL.

Copies of this patent may be obtained for five cents each, by addressing the "Commissioner of Patents, Washington, D. C."